United States Patent [19]

McDonald

[11] Patent Number: 5,358,761
[45] Date of Patent: * Oct. 25, 1994

[54] FOLDED SHEET

[76] Inventor: George W. McDonald, Bella Luce, Moulin Huet, St. Martins, Guernsey, Channel Islands

[ * ] Notice: The portion of the term of this patent subsequent to Nov. 3, 2009 has been disclaimed.

[21] Appl. No.: 970,953

[22] PCT Filed: May 8, 1989

[86] PCT No.: PCT/GB89/00488

§ 371 Date: Oct. 10, 1990

§ 102(e) Date: Oct. 10, 1990

[87] PCT Pub. No.: W89/11140
PCT Pub. Date: Nov. 16, 1993

Related U.S. Application Data

[63] Continuation of Ser. No. 457,711, Oct. 10, 1990, abandoned.

[30] Foreign Application Priority Data

May 7, 1988 [GB] United Kingdom ............... 8810866.7

[51] Int. Cl.$^5$ ............................ B32B 3/06; B32B 3/10
[52] U.S. Cl. ............................ 428/77; 428/99;
428/130; 428/137; 428/192; 283/34; 402/4
[58] Field of Search ................ 283/34; 402/4; 428/77, 428/130, 137, 192, 99

[56] References Cited

U.S. PATENT DOCUMENTS

| | | | |
|---|---|---|---|
| 1,574,838 | 3/1926 | Moore | 402/4 |
| 1,687,304 | 10/1928 | Morris | 283/34 |
| 4,595,309 | 6/1916 | Chinchar | 402/80 R |
| 5,156,898 | 10/1992 | McDonald | 428/100 |

FOREIGN PATENT DOCUMENTS

| | | |
|---|---|---|
| 2403208 | 5/1979 | France ............... 283/34 |
| 8704284 | 7/1987 | PCT Int'l Appl. . |
| 563546 | 8/1944 | United Kingdom . |
| 2192587 | 1/1988 | United Kingdom . |

*Primary Examiner*—Alexander S. Thomas
*Attorney, Agent, or Firm*—McAulay Fisher Nissen Goldberg & Kiel

[57] ABSTRACT

A sheet of material having a first set of concertina folds and, so as to be transverse to these when the sheet is folded with these folds, a second set of concertina folds, the sheet being provided with two diagonally opposite holding portions at segments thereof, which segments are at or near diagonally opposite corners of the sheet and defined by folds and/or edges thereof, one of the holding portions being stiff and the opposite holding portion having a part extending beyond the remainder of the sheet when folded, so as to be suitable to be held in a binder; the part may be pre-bound in a book or may have punch-holes, suitable for a ring-binder; the material, part from the stiff portion, may be of paper-like plastics material that is tear-resistant.

19 Claims, 1 Drawing Sheet

FOLDED SHEET

This is a continuation of application Ser. No. 07/457,711 filed Oct. 10, 1990 now abandoned and International Application No. PCT/GB89/00488 filed May 8, 1989.

BACKGROUND

This invention relates to folded sheet material, regardless of whether it is in a folded or unfolded condition.

It is known from my earlier U.S. patent application Ser. No. 213,582 filed on Jun. 23, 1988 abandoned, which was filed as application Ser. No. 213,582, filed on Jun. 23, 1988 abandoned, and refiled as continuation application Ser. No. 721,910 filed on Jun. 20, 1991, now U.S. Pat. No. 5,156,898, PCT Patent Application WO 87/04284 to provide a sheet of material (hereby defined as the "sheet material" defined in my said earlier specification, which definition is hereby intended by the expression "as hereinbefore defined") having a first set of concertina folds (which term means that the folds are alternately towards and away from the front of the sheet) and, so as to be transverse to these when the sheet is folded with these folds, a second set of concertina folds, the sheet being provided with two diagonally opposite stiff portions at segments thereof, which segments are at or near diagonally opposite corners of the sheet and defined by fold/s and/or edge/s thereof. This was intended for use by one stiff portion being held in the hand and the opposite stiff portion then being moved away from it to unfold the sheet with a single movement.

THE INVENTION

The inventor has appreciated that a sheet of this general type could usefully be engaged in a looseleaf or similar binder to provide a relatively mall thickness at the spine or binding portion and yet open out to a considerable extent, far greater than with existing Z-shaped inserts for such binders, and in particular with a single movement aided by the stiff unfolding portion.

Accordingly, the present invention provides a sheet of material having a first set of concertina folds and, so as to be transverse to these when the sheet is folded with these folds, a second set of concertina folds, the sheet being provided with two diagonally opposite holding portions at segments thereof, which segments are at or near diagonally opposite corners of the sheet and defined by folds and/or edges thereof, one of the holding portions being stiff and the opposite holding portion having a part extending beyond the remainder of the sheet when folded so as to be suitable to be held in a binder. to a usual type of pre-bound book, as it will be readily seen that the single movement and large extent of opening would be a great advantage also with a bound printed book, for example.

Such a sheet can have any of the further features disclosed in the description of my said earlier specification.

Further, it should be noted that the beyond extending part runs substantially the whole length of an edge of the appertaining segment. The beyond extending part extends beyond an edge of the appertaining segment which edge is also part of an edge of the sheet. The beyond extending part is provided with punch-holes suitable for a ring binder, and the punch-holes are arranged in a line in groups of three. The beyond extending part is reinforced around the punch-holes. The diagonally opposite folding portions are stiff. The beyond extending part and at least a neighboring part of the appertaining portions are reinforced and stiff. The material apart from the stiff portion is of paper-like plastics material and is tear-resistant.

The invention is further concerned with a sheet of material having two diagonally opposite folding portions, one being stiff and the other extending beyond the remainder of the sheet when folded, and the sheet is more specifically defined as hereinbefore set forth.

The invention is also concerned with a binder or bound volume which comprises at least one sheet of the type hereinbefore defined.

BRIEF DESCRIPTION OF THE DRAWINGS

Reference will now be made by way of example to the accompanying drawings, in which.

Figure 1:
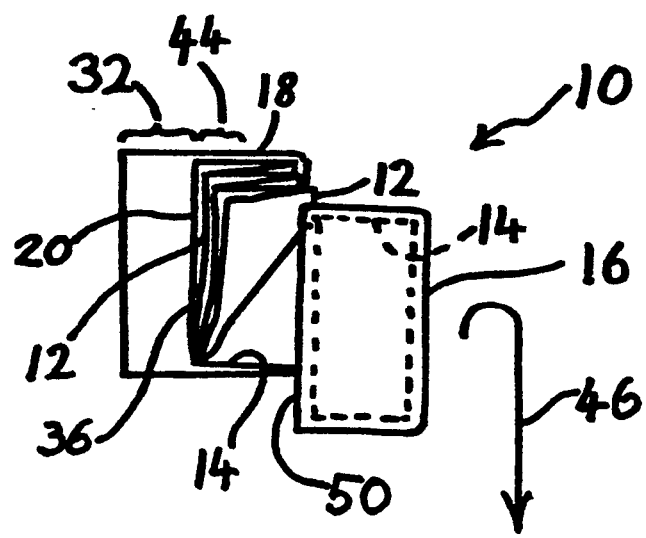
FIG. 1 corresponds to FIG. 2 of my said earlier specification and shows a sheet embodying the present invention partly open.
Figure 2:
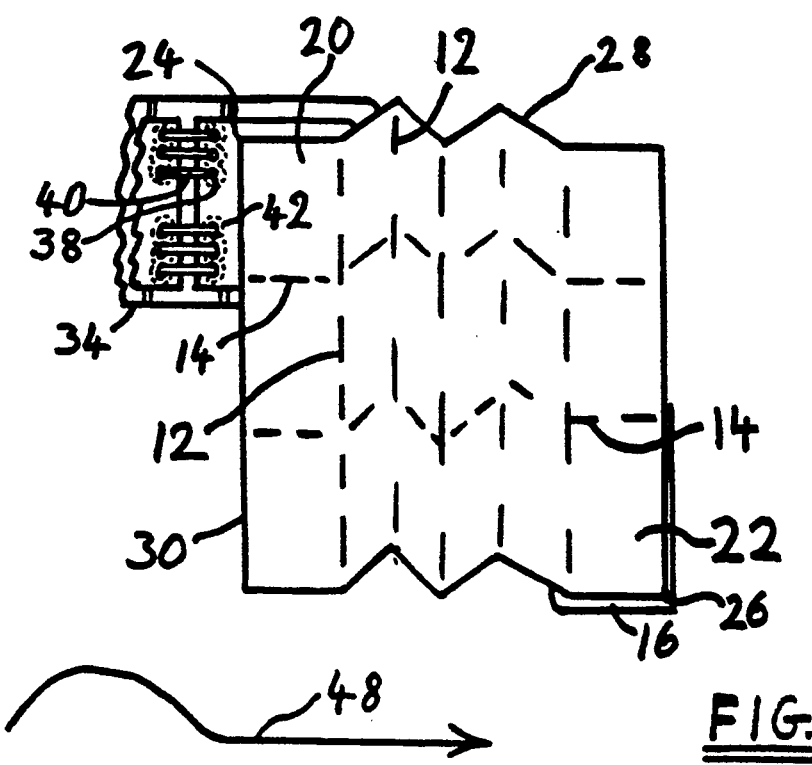
FIG. 2 corresponds to FIG. 4 of my said earlier specification and shows the sheet of an alternative embodiment of the present invention almost fully open.

Referring to the drawings, a sheet of paper 10 has a first set of concertina folds 12 and, so as to be transverse to these folds 12 when the sheet is folded with these folds into the position shown in FIG. 1, a second set of concertina folds 14, the sheet being provided with two diagonally opposite holding portions 16,18 at segments 20,22 of the sheet 10, which segments are at or near diagonally opposite corners 24,26 of the sheet and are defined by folds 12,14 and edges 28,30 of the sheet 10. One of the holding portions 16 is stiff and the opposite holding portion 18 has a part 32 extending beyond the remainder of the sheet when folded, as seen in FIG. 1, so as to be suitable to be held in a binder 34. The part 32 runs substantially the whole length of an edge 36 of the appertaining segment 20 and extends beyond this edge 36 which is also part of an edge 30 of the sheet 10. The part 32 of the embodiment seen in FIG. 2 has punch-holes 38 suitable for the rings 40 of ring-binder 34. Punch-holes 38 may be arranged as seen in FIG. 2 in a line in groups of three, e.g. suitably for binder 34 to be that known under the Trade Mark FILOFAX. Part 32 may be reinforced around punch-holes 38 as indicated by dotted lines 42. In an alternative embodiment, said opposite portion 18 is stiff and reinforcement 42 is not required. In a further alternative embodiment, said part 32 and at least a neighbouring part 44 of the appertaining portion 18 are reinforced and stiff so that individual punch-hole reinforcement 42 is not required. Both of these last two methods of reinforcement (whole of portion 18 being stiff or parts 32,44 being reinforced and stiff) can be applied to the FIG. 1 embodiment in which there are no punch-holes and the sheet 10 is intended for insertion in a spring-binder, or equally in a book to be permanently pre-bound before sale. As a further alternative form of the FIG. 2 embodiment for a ring-binder, the material of the sheet 10, apart from the stiff portion 16, can be made of known paper-like plastics material that is tear-resistant. This takes print or writing and, because of its tear-resistant property, may be produced without reinforcement 42, portion 18 then being one with the folded part.

Clearly, the sheet 10 may have any of the further features disclosed in my said prior specification. It is used by unfolding it from the folded position, first by lifting and pulling downwards on stiff portion 16 in the direction indicated by arrow 46 (an intermediate stage of which movement is shown in FIG. 1) and then continuing the movement by twisting portion 16 so that its left hand edge 50 comes towards the viewer of FIG. 1 and the whole portion 16 is pulled further over to the right as seen in FIG. 2, all as indicated by arrow 48.

Many variations of the present invention and the embodiments of it hereinbefore described will be apparent to people skilled in the art and all such variations are to be considered as falling within the appended claims.

We claim:

1. A sheet of material comprising:

a first set of concertina folds and a second set of concertina folds to permit folding of said sheet between an unfolded and a folded condition, said second set of concertina folds being transverse to said first set of concertina folds when said sheet is folded, and the quantity of said first and said second set of concertina folds being different from each other;

said sheet having two diagonally opposite segments and being provided with solely two diagonally opposite corner holding portions, one of said diagonally opposite corner holding portions being at one of said diagonally opposite segments and the other of said corner holding portions being at the other of said diagonally opposite segments, said segments being at diagonally opposite corners of said sheet and being defined by at least one of a fold and an edge thereof;

one of said corner holding portions being stiff and intended for holding and said opposite corner holding portion including a beyond extending part extending beyond the remainder of said diagonally opposite segments of said sheet when folded and intended for holding and retaining; and holding means associated with said beyond extending part adapted for holding and retaining said sheet in a binder while leaving said one of said corner holding portions free for holding and opening with a single movement.

2. The sheet as claimed in claim 1, in which said beyond extending part associated with said holding means extends substantially the whole length of an edge of one of said segments.

3. The sheet as claimed in claim 1, in which said beyond extending part extends beyond edges of a corner edge of one of said segments and which edges are also part of said corner edge of the sheet.

4. The sheet as claimed in claim 1, in which said holding means on said beyond extending part includes punch-holes suitable for a ring binder and said beyond extending part is reinforced around said punch holes.

5. The sheet as claimed in claim 1, in which said holding means and said beyond extending part are stiff.

6. The sheet as claimed in claim 1, in which said holding means includes a beyond extending part and a neighboring part, and said beyond extending part and said neighboring part are reinforced and stiff.

7. A sheet of material comprising:

a first set of concertina folds and a second set of concertina folds to permit folding of said sheet between an unfolded and a folded condition, said second set of concertina folds being transverse to said first set of concertina folds when said sheet is folded, and said first and said second set of concertina folds being unequal to each other;

said sheet having two diagonally opposite segments defined by said concertina folds and being provided with two diagonally opposite corner portions, one of said diagonally opposite portions being solely a corner holding portion and being at one of said segments and the other of said corner portions being at the other of said segments and being solely a holding and retaining portion, said segments being at or near diagonally opposite corners of said sheet and being bounded by at least one of a fold and an edge thereof;

said first set of folds being an odd number of folds and said second set of folds being an even number of folds, said first and said second set of folds defining said segments of said sheet and being mutually perpendicular and parallel to respective edges of said sheet, and a portion of one of said odd number of folds and a portion of one of said even number of folds forming two sides of one of said segments;

said one of said corner holding portions being stiff and the other of said corner holding portions being said opposite corner holding and retaining portion including a beyond extending part extending beyond said edges of said other of said segments and which edges are also part of edges of the sheet; and binder holding means associated with said beyond extending part adapted solely for holding said sheet in a binder, and said holding means on said beyond extending part extending beyond said edges of said other of said segments.

8. The sheet as claimed in claim 7, in which said beyond extending part is provided with punch-holes suitable for a ring binder.

9. The sheet as claimed in claim 8, in which said beyond extending part is reinforced around said punch-holes.

10. The sheet as claimed in claim 7, in which said holding means is stiff.

11. The sheet as claimed in claim 7, in which said holding means on said beyond extending part and at least a neighboring part of an associated portion are reinforced and stiff.

12. A binder or bound volume comprising at least one sheet as claimed in claim 7.

13. The sheet of material of claim 7, wherein said diagonally opposite corner holding portions are provided solely at said diagonally opposite segments.

14. The sheet of material of claim 7, wherein each of said diagonally opposite corner holding portions extend beyond said at least one of said folds and said edge of each of said opposite corner holding portions.

15. The sheet of material of claim 7, wherein said diagonally opposite corner holding portions are provided solely at said diagonally opposite segments, each of said diagonally opposite corner holding portions extending beyond both a first corner edge of one of said corner segments parallel to said first set of said concertina folds and a second corner edge of said one of said corner segments parallel to said second set of concertina folds.

16. A sheet of material comprising:

a first set of concertina folds and a second set of concertina folds to permit folding of said sheet between an unfolded and a folded condition, said second set of concertina folds being transverse to said first set of concertina folds when said sheet is folded and said first and said second set of concertina folds being unequal to each other;

said sheet having two diagonally opposite segments and being provided with two diagonally opposite corner holding portions, one of said diagonally opposite corner holding portions being at one of said segments and the other of said corner holding portions being at the other of said segments, said segments being at or near diagonally opposite corners of said sheet and being defined by at least one of a fold and an edge thereof, and said opposite corner holding portions being adapted to be moved away from each other to unfold said concertina folds from each other;

one of said corner holding portions being stiff and said other opposite corner holding portion also being a retaining portion and including a beyond extending part extending beyond the remainder of said sheet when folded;

said beyond extending part extending beyond an edge of one of said segments and which edge is also part of an edge of the sheet; and holding means associated with said beyond extending part adapted for holding said sheet in a binder, said holding means extending in two directions beyond said beyond extending part.

17. The sheet as claimed in claim 16, in which said holding means on said beyond extending part includes punch-holes suitable for a ring binder, said beyond extending part being reinforced around said punch-holes, and said holding means being stiff.

18. The sheet of material of claim 16, wherein said diagonally opposite corner holding portions are provided solely at said diagonally opposite segments, each of said diagonally opposite corner holding portions extending beyond both a first corner edge of one of said corner segments parallel to said first set of said concertina folds and a second corner edge of said one of said corner segments parallel to said second set of concertina folds.

19. A binder or bound volume including at least one sheet as claimed in claims 16.

* * * * *